United States Patent [19]

Lawler et al.

[11] Patent Number: 5,930,798
[45] Date of Patent: Jul. 27, 1999

[54] UNIVERSAL DATA MEASUREMENT, ANALYSIS AND CONTROL SYSTEM

[75] Inventors: James M. Lawler; Tina M. Navarro, both of San Diego, Calif.

[73] Assignee: Predicate Logic, Inc., San Diego, Calif.

[21] Appl. No.: 08/698,091

[22] Filed: Aug. 15, 1996

[51] Int. Cl.$^6$ .................................................. G06F 17/30
[52] U.S. Cl. ...................... 707/102; 395/701; 395/183.14
[58] Field of Search .................................... 395/702, 703, 395/710, 701; 707/3, 4, 5, 101–104

[56] References Cited

U.S. PATENT DOCUMENTS

| | | | |
|---|---|---|---|
| 4,740,886 | 4/1988 | Tanifuji et al. | 364/150 |
| 4,887,206 | 12/1989 | Natarajan | 364/401 |
| 5,123,103 | 6/1992 | Ohtaki et al. | 707/5 |
| 5,159,687 | 10/1992 | Richburg | 707/5 |
| 5,206,951 | 4/1993 | Khoyi et al. | 395/650 |
| 5,261,100 | 11/1993 | Fujinami et al. | 395/702 |
| 5,526,522 | 6/1996 | Takeuhci | 395/702 |
| 5,606,661 | 2/1997 | Wear et al. | 395/183.14 |
| 5,699,310 | 12/1997 | Garloff et al. | 395/701 |

OTHER PUBLICATIONS

"Towards a Framework for Software Measurement Validation", Kitchenham et al., IEEE Transactions on Software Engineering, vol. 21, No. 12, pp. 929–944, Dec. 1995.

*Primary Examiner*—Thomas G. Black
*Assistant Examiner*—Hosain T. Alam
*Attorney, Agent, or Firm*—Steins & Associates

[57] ABSTRACT

A universal data measurement, analysis and control system is disclosed. The system will permit end-users to analyze the measurement protocol by publishing the data gathering environments and data definitions. The disclosed system will manage the exchange of data between different software applications and provide consistent metric data outputs. Furthermore, the disclosed method provides an analysis system that defines a consistent and repeatable measurement model that also supports changes to a control object over time in addition to changes to the measurement data associated with the control object. Specifically disclosed is a method for gathering engineering change proposal data, for determining the causes for the engineering change proposal, and also providing a historical repository. As it applies to software development, the disclosed method defines a model for maintaining measured data, a consistent method for harvesting data from within the software development environment, a reporting mechanism for displaying the measurement data in a timely format, and also provides a mechanism for analysis of software process improvement, in addition to software project analysis.

20 Claims, 9 Drawing Sheets

UNIVERSAL DATA MEASUREMENT, ANALYSIS AND CONTROL SYSTEM

BACKGROUND OF THE INVENTION

1. Field of the Invention

This invention relates generally to data analysis and control systems and, more specifically, to a method of providing a universal data measurement, analysis and control system for a variety of types of input data.

2. Description of Related Art

Despite all of the technological advances in software, the software industry has experienced an explosion of cost and schedule overruns in the billions of dollars (see for example GAO 1994 report[1]). These overruns continue to focus on the software project management problem of accurately estimating the cost and schedule to complete a project and to accurately monitor these forecasts, as well as status throughout the project life cycle. The general solution has been to use software cost models such as COCOMO or PRICE-S along with a project management tool, such as Microsoft Project. However, these models' performance has been less than adequate, as evidenced by the GAO report. The root cause of the problem can be traced to the data these tools inherently rely on. Since all software costing models must be calibrated to measurements obtained from many projects, each having slightly different measurement protocols, one can easily see that a lack of internally consistent data will give rise to poor forecasts. It follows that if the resulting measurements are of dubious value, then all status estimates and forecasts are also questionable. In fact, this same reasoning extends beyond cost and schedule, and the metrics for quality, safety, complexity, and size are also in question.

[1] "Improving Mission Performance Through Strategic Information Management and Technology," GAO/AIMD-94-115, May 1994.

The problem is complicated because this data is obtained from a measurement process that is not precisely repeatable; it is primarily an inconsistent manual process. In other words, the problem is that a measurement protocol has not been adequately defined. A measurement protocol relies on, and requires, consistently well-defined measurements and relationships between these measurements. This is generally referred to as a data measurement model or schema. Present metric software tools do not provide this data schema.

Attempts by software engineering tool manufacturers to provide some measurement information have been inconsistently implemented. The primary reason is that the tool manufacturers are solving other problems, such as providing design aids or requirements traceability. Providing proper measurement data is typically an afterthought. In addition, good forecasting techniques rely on frequent and timely measurements maintained consistently over time.

A further complication is that project level forecasts frequently require data obtained from different software tools. If each software tool generates its own measurements, time and effort are required to integrate this data and generate meaningful reports. This analysis is a time consuming process which typically involves a spreadsheet and manual input by a user. In fact, for organizations which have tried this approach, approximately 5% or more of the total project cost went into software measurement collection and reporting, for minimum core level metrics, such as cost, schedule, size and quality.

Most existing software applications provide metrics within the scope of the functionality provided by the software application. An example of this is "Microsoft Project," or "Project." "Project" provides a project management tool which creates a work breakdown structure to organize tasks that must be accomplished for a project. "Project" also provides the capability to measure effort and schedule metrics which are derived from the data stored within the "Project" database. These metrics are limited to the view of data provided by the "Project" package. A mechanism is not provided for understanding the cause or reason for the value of a given metric. In addition, "Project," as well as other tools today, do not provide a continuous historical repository. The result is that trends are difficult to extract, let alone examine and analyze.

Another popular metric tool is the "Amadeus" Measurement System. "Amadeus" provides effort, schedule, defects, and size metrics. "Amadeus" also provides a file system monitor for the automated collection of metrics. The "Amadeus" metric collection tools are limited to source code counters. "Amadeus" provides source code counters for Ada, C++, Csh, and C. "Amadeus" does not provide; however, a mechanism for user-defined metrics, nor for creating and managing integrated data models between applications. This limits analysis to only one activity, the writing and editing of software code. What is really needed is a mechanism for understanding the cause of a metric value.

A consulting firm, "Software Productivity Research," provides a software metric tool which has a historical database to be used for estimation purposes. "Software Productivity Research" does not publish the environments from which the data was gathered, nor do they provide a definition of the data gathered. This leads to a lack of understanding of the measurement protocol. End users must rely on estimations which may or may not correctly reflect their project environment. A system that permits end-users to analyze the measurement protocol by publishing the data gathering environments and data definitions would be very helpful to the process management function.

Another invention, Khoyi, et. al., U.S. Pat. No. 5,206,951, addresses the problem of integration of applications and data from different software applications. Khoyi provides a group of object management data structures and packages of generic routines for performing operating system-type tasks. The object managers perform the object management functions on the data. A table is provided to identify the appropriate object manager to use for a given object. Each object manager supports different exchange formats for data exchange. Khoyi addresses the problem of data exchange but not the gathering of consistent metric data. A system that manages the exchange of data between different software applications and results in consistent metric data is needed.

Tanifuji, et. al., U.S. Pat. No. 4,740,886, solves the problem of modifying code when new mathematical models are introduced into a system. These mathematical models describe the control objects of the system. The usual strategy is to translate a mathematical model to programming code to apply the mathematical model to the real system. When the mathematical model changes, the programming code must be changed and updated. Tanifuji allows the user to enter a mathematical formula into the system then the system automatically translates the formula to a kind of program. This translation is implemented by having the user enter the mathematical formula in a specific format. This format is then converted to mathematical code. Tanifuji does not teach support changes to the control object. It is limited to the current state of the control object. Modifications must be made when the control object is changed. A system that supports the changes of a control object over time as well as changes to the measurement data associated with the control object is needed.

Natarajan, U.S. Pat. No. 4,887,206, provides an interactive system which takes information from engineering change notices released for an item and estimates the impact on the inventory system. Natarajan requires a user to enter the change notice. Once the change notice is entered, the program provides the cost for those items impacted by the change, those items impacted by the change that are in progress, and those items impacted by the change that are in demand. Natarajan accesses an inventory database for all raw material and finished product in which the item is used; a financial database is accessed for cost information. Natarajan does not address the causes of an engineering change proposal, it does not provide an historical repository, and does not provide an automated means for gathering the engineering change proposal. A method for gathering the engineering change proposal data, for determining the causes for the engineering change proposal, and also providing a historical repository would be very beneficial.

A further problem with the prior art is that nowhere is there a comprehensive estimating and forecasting tool which provides data in a consistent and timely manner. As a result of this, in-depth data analysis is cost-prohibitive, and therefore virtually impossible. What is needed is an analysis system that defines a consistent and repeatable measurement model. This system should define a model for maintaining the measured data, a consistent method for harvesting data from within the software development environment, a reporting mechanism for displaying the measurement data in a timely format, and also provide a mechanism for analysis of software process improvement, in addition to software project analysis.

SUMMARY OF THE INVENTION

In light of the aforementioned problems associated with the prior devices, it is an object of the present invention to provide a method of providing a universal data measurement, analysis and control system. The system will permit end-users to specify and analyze the measurement protocol by publishing the data gathering environments and data definitions within the scope of the discretionary access metric policy. It is a further object that the system manage the exchange of data between different software applications and provide consistent metric data outputs. A further object of the present invention is to provide an analysis system that defines a consistent and repeatable measurement model that supports changes to a control object over time in addition to changes to the measurement data associated with the control object. Still further, and more specifically, it is an object to provide a method for gathering engineering change proposal data, for determining the causes for the engineering change proposal, and also providing a historical repository. As it applies to software development, it is an object that the system define a model for maintaining measured data, a consistent method for harvesting data from within the software development environment, a reporting mechanism for displaying the measurement data in a timely format, and also provide a mechanism for analysis of software process improvement, in addition to software project analysis by forecasting, for example. The aforementioned objects are met by first creating a standardized hierarchical index to existing data. This data could originate from various sources. Said index is generated under a series of pre-defined rules, such that data from different types of sources may be matched together for later analysis and control purposes.

Once this formatted hierarchical index is created, the index is selectively instantiated at different occasions. The present invention also may include a comparing step, where the indexed data can be compared and analyzed to produce control data, if desired. The comparing step furthermore permits the relating of data that did not have any defined relationship at the time of index instantiation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a method of providing a universal data measurement, analysis and control system for a variety of types of input data.

Establishing a Standardized Measurement Protocol

It is perhaps incredible to think that in an environment as potentially so self-documenting as a software environment on a network of computers, setting up a consistent measurement protocol would be an issue. It is, in fact, just this reason that software measurements have been inconsistently collected. A measurement protocol attempts to define, and thereby control, its environment so as to hold as much as possible constant. Therefore, a measurement protocol ensures the repeatability of a measurement so that any difference from one measurement to the next is due to the factor under measurement and not to other confounding variables.

In a software environment there are literally thousands of possible combinations of objects to measure. For example, most software managers want to know how large a development is in terms of source lines of code. The first question that must be answered is what is a source line of code. Which Work Products do we include? Do we include data statements, comment lines, blank lines? How do we count code libraries? How do we count source code produced from code generators? Do we count only new source code or can we include modified source code? The answer to each of these questions results in specifying part of the measurement protocol.

Further compounding the problem, is the fact that a typical software environment changes frequently. Using the above example, imagine that a new computer language is added halfway into the project, or certain functionality is deleted, or a new version of a compiler is installed. Moreover, what if the actual protocol used to set up the original measurement involved a multitude of decisions but is not documented sufficiently to ensure precise replication? It is the existence of all of these possible permutations of measurement protocols that have resulted in inconsistent and unrepeatable software measurements.

Figure 1:
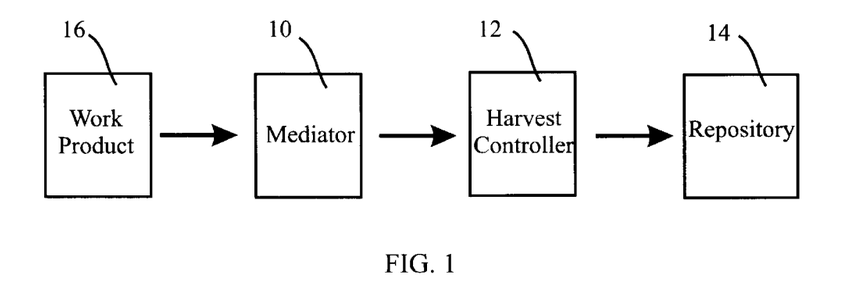
FIG. 1 depicts the flow of measurement data.

FIG. 1 demonstrates the measurement data flow of the present invention. To solve the problem of inconsistent and unrepeatable measurements, the present invention defines the Mediator 10 and the Harvest Controller 12. The Mediator 10 is an agent that actually takes measurements of objects in the software development environment and transfers this data to the metrics Repository 14 via the Harvest Controller 12 (Harvestor for simplicity). The objects under measurement, called Work Products 16, are generated by various software applications, which include any tangibly measurable software object, such as a source code file, document, database and directory (not shown). The Harvestor 12 may be triggered either automatically or at a user request, at regular intervals, or sporadically, to start the Mediator 10 and access the measurable objects and their associated measurements.

Figure 2:
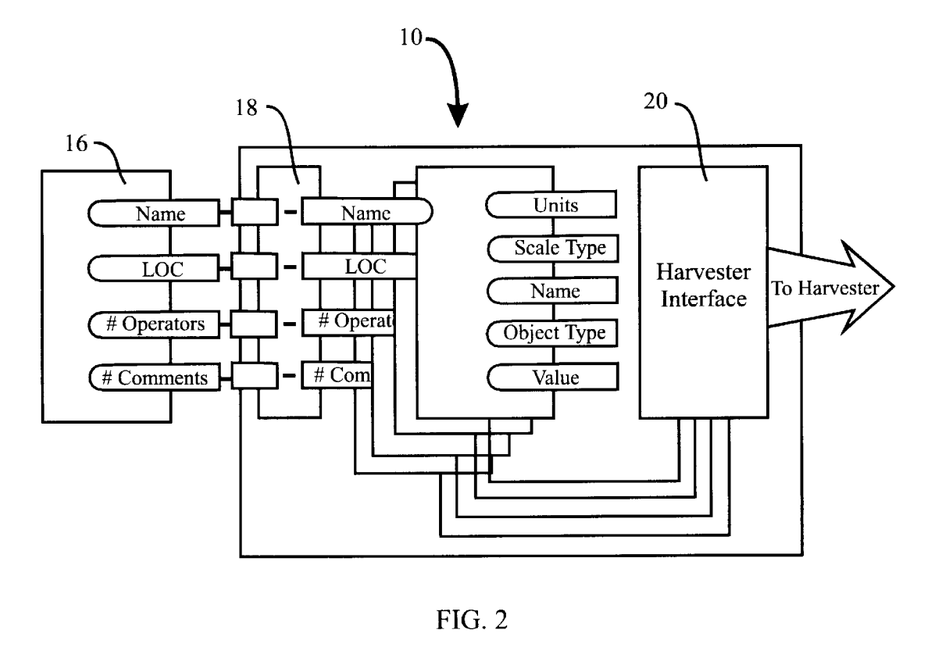
FIG. 2 describes the operation of the Mediator.

Turning now to FIG. 2, it can be seen that the Mediator 10 is comprised of Work Product and Harvestor interfaces. The purpose of the Work Product interface, or Probe 18, is to access and measure the Work Product data in accordance with the measurement protocol. Included with each measurement is a unique identifier which enables traceability from the Work Product 16 to the measurement's final representation. This unique identifier permits tracking the object measurements over time. In addition, a security label is included for enforcing a Discretionary Access Policy Metric. The Discretionary Access Policy Metric is referred to below with regard to the discussion of FIG. 5.

The Harvestor interface 20 is the point at which a measurement model is provided for use outside the Mediator 10. The Harvestor interface 20 uses an industry standard to facilitate the exchange of metric data between the Harvestor (See FIG. 1), and the Mediator 10.

Figure 3:
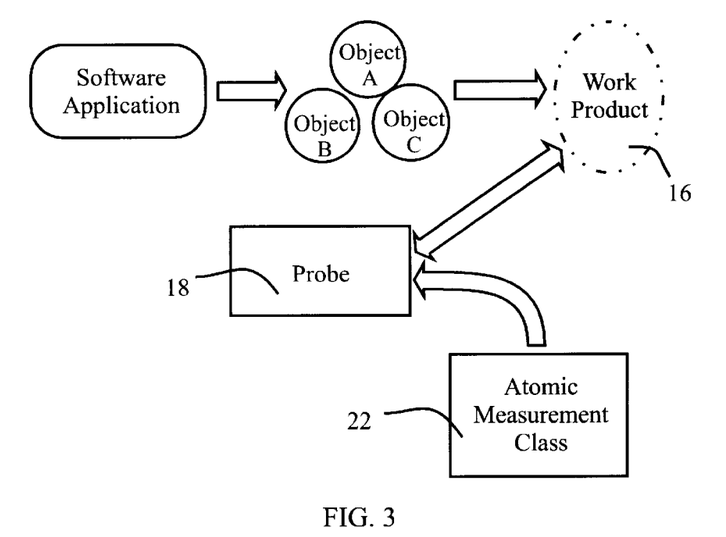
FIG. 3 depicts the relationship between Atomic Measurement Class and the Probe.

FIG. 3 gives further detail of the data organizing method of the present invention. Within the context of the Harvestor and Mediator (See FIG. 1), the present invention also defines an organizing object called Atomic Measurement Class 22. The Atomic Measurement Class 22 contains the information necessary to maintain the integrity of the measured object.

For every Atomic Measurement Class 22, a measurement protocol, its scale type and units of measurement are maintained. (Fenton and Kitchenham[2], originally identified these properties as necessary to software measurement). The scale type of each Atomic Measurement Class 22, as well as the parameters necessary to adequately describe the scale type, is maintained as one of five admissible transformations: nominal, ordinal, interval, ratio, and absolute (see Fenton[3]).

[2] B. Kitchenham, S. L. Pfleeger, and N. Fenton, "Towards a Framework for Software Measurement Validation," *IEEE Trans. Software Eng.*, vol. 21, pp. 929–944, 1995.
[3] Fenton, N., Software Metrics, A rigorous approach.

The novel approach of using the Atomic Measurement Class 22 along with the Mediators 10 and Probes 18 provides for the creation of consistent and repeatable measurement data throughout the lifetime of the Work Product 16, as well as throughout the software environment. The Mediator 10 provides a well-defined method for extracting measurements from a Work Product 16 and associating those measurements to objects within a Work Product 16. The Probe 18 performs the measurement according to the protocol of the Atomic Measurement Class 22. In addition, this approach provides a consistent basis for comparisons between measurements taken from different applications within the environment.

Defining a Standardized Organizational Structure

Although Fenton and Kitchenham (Fenton[4]) address the measurement issue, they fail to adequately address the object being measured and its relationship to other objects or other Work Products 16. This is critical to understanding and analyzing the measurements.

[4] Ibid.

Figure 4:
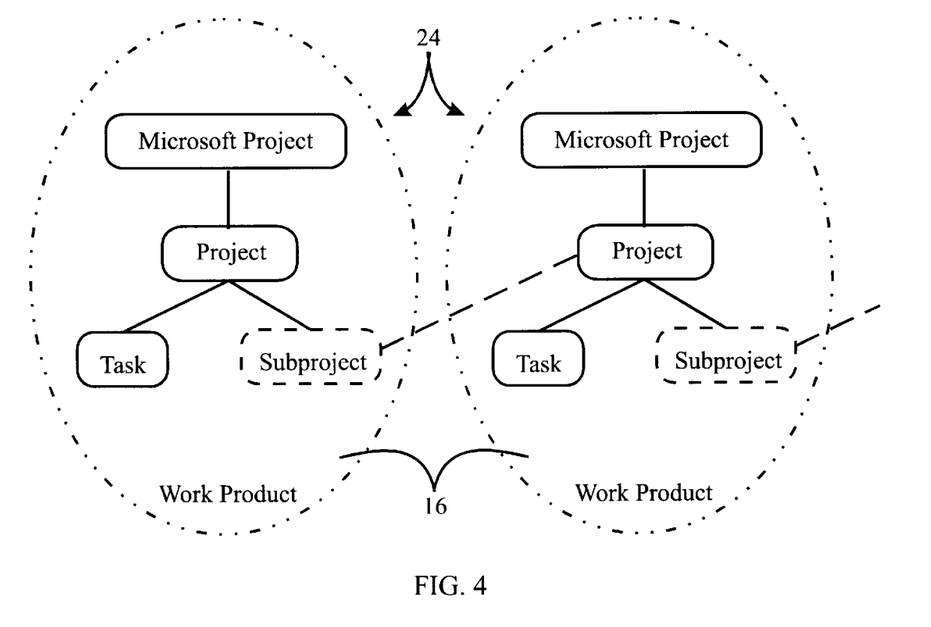
FIG. 4 gives an example of the functioning of the Atomic Relationship Class.

FIG. 4 depicts how the present invention addresses the issue of relationships between data objects. The present invention defines the Atomic Relationship Class 24. The relationships between Work Product 16 objects are documented in the Atomic Relationship Class 24 through links. Two link types may exist between data objects, those within one Work Product 16 object and those between two or more different Work Product 16 objects created by a software application. As shown, the present invention defines both types of links through the Atomic Relationship Class 24. The Atomic Relationship Class 24 is easily extendable to other relationships, such as aggregates, uses, traceability, etc. The Atomic Relationship Class 24 provides a mechanism for understanding measurement through understanding relationships between objects.

Figure 5:
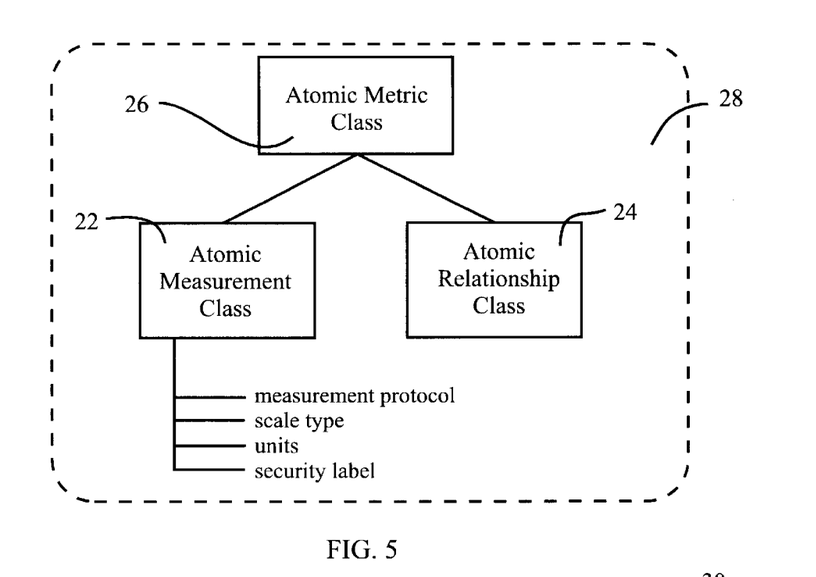
FIG. 5 depicts the Measurement Object Model.

FIG. 5 depicts how an Atomic Measurement Class 22 and an Atomic Relationship Class 24 are grouped into a single Atomic Metric Class 26 for each data object. The Atomic Metric Class 26 is a template by which the Harvestor (See FIG. 1) requests and receives descriptive information about a particular Work Product (See FIG. 4) data object. Typically, multiple Atomic Metric Classes 26 exist per Work Product (see FIG. 4). These Atomic Metric Classes 26 may be linked together in a configuration, called the Measurement Object Model (see FIG. 6) that matches the aggregation of Work Products (see FIG. 4) that are within the scope of a particular software application.

Figure 6:
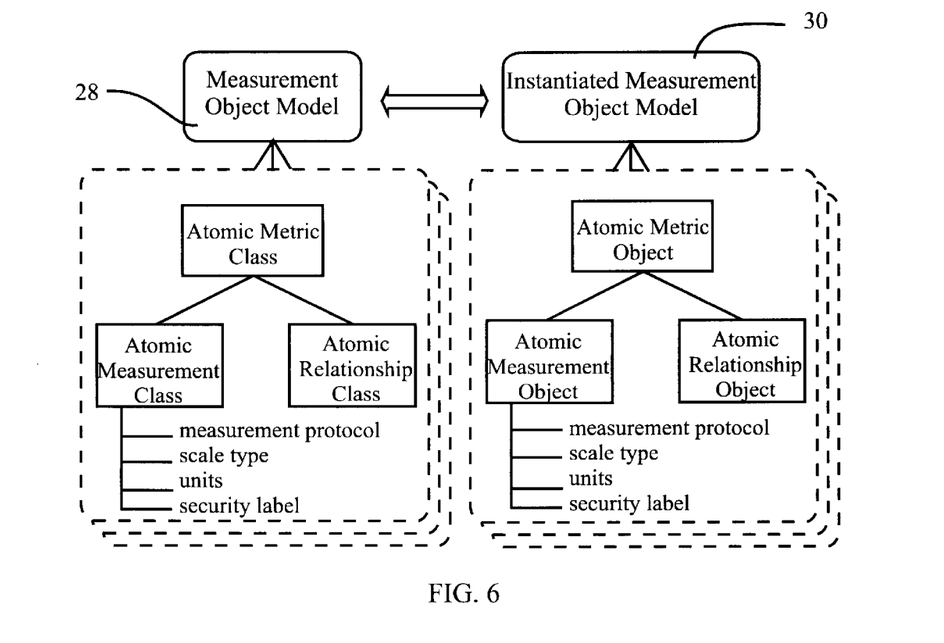
FIG. 6 describes the relationship between the Measurement Object Model and the Instantiated Measurement Object Model.

FIG. 6 displays one portion of a Measurement Object Model 28. As discussed above, the Measurement Object Model 28 is the organizational structure of the Atomic Metric Classes 26 within a particular software application. Once the Measurement Object Model 28 is created and obtained by the Harvestor (see FIG. 1), Instantiated Measurement Object Models 30 are created periodically, to make a historical record of changes to the Work Products (see FIG. 4).

In operation, the Harvestor's (see FIG. 1) first request to the Mediator (see FIG. 1) is for the Measurement Object Model 28. The Measurement Object Model 28 contains the set of all Atomic Metric Classes 26 and their relationships to one another. The Measurement Object Model 28, therefore, identifies the rules for measuring the data from a selected Work Product. Once the rules have been obtained, the Harvestor (see FIG. 1) requests an Instantiated Measurement Object Model 30.

The Instantiated Measurement Object Model 30 is a concrete example of, or is an instantiation of the Measurement Object Model 28. This instantiation includes all the objects, object relationships, a unique identifier for each object, and measurements identified by the Measurement Object Model 28 for the Work Product (see FIG. 4). The unique identifier permits tracking the Instantiated Measurement Object Model 30 over time. The Measurement Object Model 28 is requested only once; however, the Instantiated Measurement Object Model 30 is requested at regular intervals. Each time the Instantiated Measurement Object Model 30 is harvested, a time stamp is associated with the object. The occurrence of these requests may also be responsive to the activity of a particular Work Product (see FIG. 4) being monitored, so that when a certain amount of activity is detected anywhere within the Work Product (see FIG. 4), an Instantiated Measurement Object Model 30 will be requested. Furthermore, a manual request for an Instantiated Measurement Object Model 30 may be input to the Harvestor (see FIG. 1) from outside the system, such as by a user.

Figure 7:
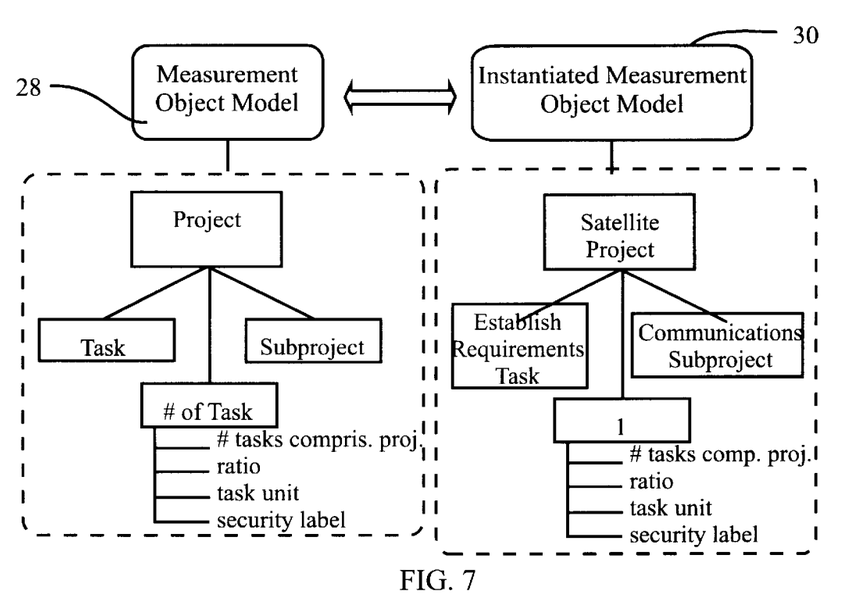
FIG. 7 is an example of the relationship between a Measurement Object Model and an Instantiated Measurement Object Model.

Referring now to FIG. 7, an example is provided as the Measurement Object Model 28 would apply to the data structure of FIG. 4.

In summary, the method of the present invention identifies the Work Product being measured and the measurement(s) associated with that object. It further incorporates the measurement protocol, atomic metric properties, and its relationships. The present invention further defines a measurement model in terms of the Measurement Object Model 28 for maintaining measurement data integrity. Atomic Metric properties include the measurement units, scale type, and the actual value. The strengths of this model allow for consistent comparisons of data between similar software projects, as well as comparisons of data within a software project. This invention can apply this Measurement Object Model to any Work Product (see FIG. 4) in a software development environment. The invention maintains data internally in the Atomic Metric Class format.

Merging Data From Multiple Software Tools While Preserving Data Integrity

Figure 8:
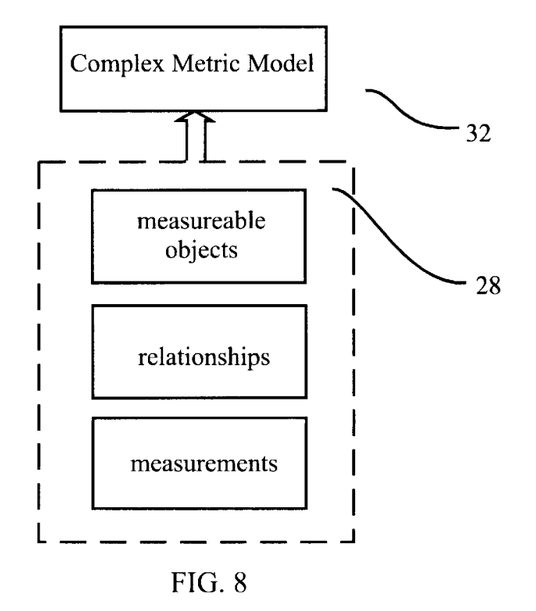
FIG. 8 depicts the Complex Metric Model.
Figure 9:
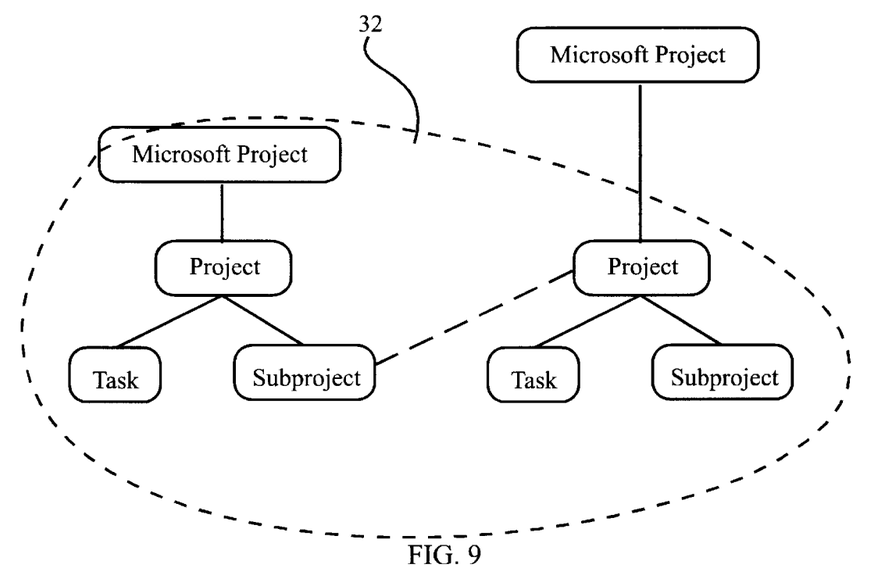
FIG. 9 is an example of a Complex Metric Model.

Many software development environments use more than one type of software language compiler. The project manager may need to know the total size of the project in terms of source lines of code. The problem now becomes how to combine the counts of source lines of code from different compilers in a consistent manner. Each Work Product resulting from each compiler may have a similar, but not exact, measurement protocol and measurable objects. In addition, and more importantly, the measurable objects within the Work Product may have different relationships between themselves. Continuing the example, a C++ compiler knows about objects, templates, and classes whereas the C compiler has no such definitions. The present invention accurately defines these relationships as Metrics that will determine the form of the output, so as to ensure consistency when the lines of code are to result in a combined, single count; FIGS. 8 and 9 describe this aspect.

As shown in FIGS. 8 and 9, the format of the output from the present invention is defined by a Complex Metric Model 32. The Measurement Object Model 28 is the basis for defining the Complex Metric Model 32. A Complex Metric Model 32 contains the final representation of the processed data as required by the user. The Complex Metric Model 32 is a hierarchical structure used to organize the Atomic Metric Classes (see FIG. 6). The Complex Metric Model 32 inherits all the Measurement Object Model's 28 properties while defining relationships between them to maintain consistency. The Complex Metric Model 32 could also be identical to the Measurement Object Model 28. However, if a relationship is desired which cannot be specified through these two relationships, another relationship is defined in which the end user establishes a relationship, within the scope of the Complex Metric Model 32, to exist between two Atomic Metric Classes (see FIG. 4). This relationship is called a Schema Tunnel Relationship, and is best understood with reference to FIG. 10.

Figure 10:
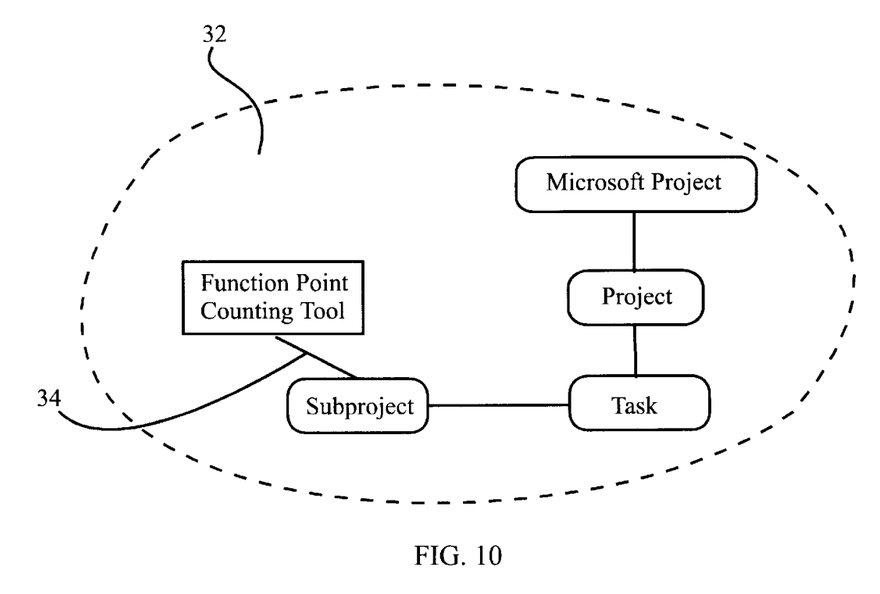
FIG. 10 is another example of a Complex Metric Model, including a Schema Tunnel.

Quite often in software development environments, data generated from two different software applications must be analyzed as a whole to understand a problem. Typically in these cases, each software application works independently of each other and is unaware of the data maintained by each application. Because of this lack of knowledge, the Measurement Object Model (see above), which reflects the Work Product's intrinsic object organization, would not support any links between the objects generated by the two independent software applications. To solve this problem, the present invention introduces the Schema Tunnel 34. A Schema Tunnel 34 defines a relationship between objects which would not otherwise exist. This novel approach allows the end-user to identify appropriate relationships between objects of different Work Products so that analysis may proceed. FIG. 10 provides an example where a Schema Tunnel 34 is used to establish a relationship between a Task of Microsoft Project and an Application of a function point counting tool. A function points counting tool supports a process for measuring the size of software applications.

This novel approach provides the user with the ability to create and relate different objects for better metric analysis. It also provides a method or process for traceability between objects. For example, this unique indexing scheme allows a requirements object to be related to a design object because the design object satisfies the requirement. This approach also begins to set up a method for analysis to understand the causes of metric measurement values.

User-Definable Metrics

In software development environments today, the metrics provided to an end-user are usually pre-defined and are based on values in a commercial historical metric database provided by the vendor. Pre-defined metrics limit the end-user to that single focus. Different metric models which may provide additional insight into a problem are therefore not available. In the event that metrics can be defined by the end user, the metric data used is typically poorly understood and inconsistently gathered. To compound the problem, commercial historical metric databases do not usually publish the environments from which the data was gathered nor do they provide a valid definition of the data. In the context of the present invention, other tools have had no way of capturing the measurement protocol.

Figure 11:
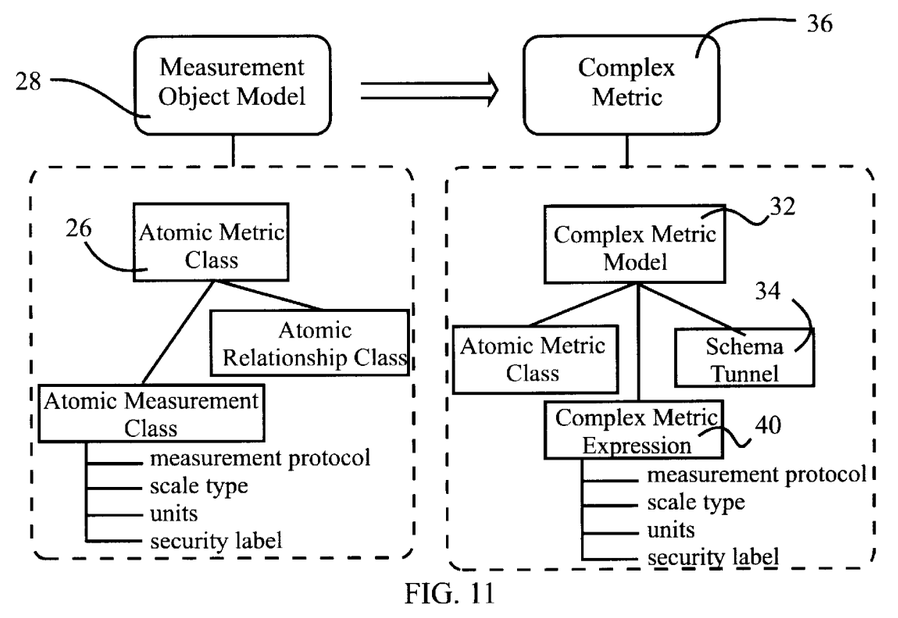
FIG. 11 depicts the relationship between the Measurement Object Model and a Complex Metric.

FIG. 11 assists in describing how the present invention provides a method for developing new metrics based on a consistent data model and measurement model. This invention refers to these new metrics as Complex Metrics 36. A Complex Metric 36 inherits all the properties of the Atomic Metric Class (see above) with the following differences: (1) the object model supported by the Complex Metric 36 is the Complex Metric Model 32, (2) the measurement protocol is defined by the Complex Metric's 36 mathematical expression, and (3) the Schema Tunnel 34 relationship is supported. The Complex Metric 36 defines a rule set for combining metrics.

All the components of the Complex Metric 36 have been previously discussed with the exception of the Complex Metric Expression 40. The Complex Metric Expression 40 is a mathematical expression consisting of Atomic Measurement Class(es) 26 and other Complex Metrics 36.

Figure 12:
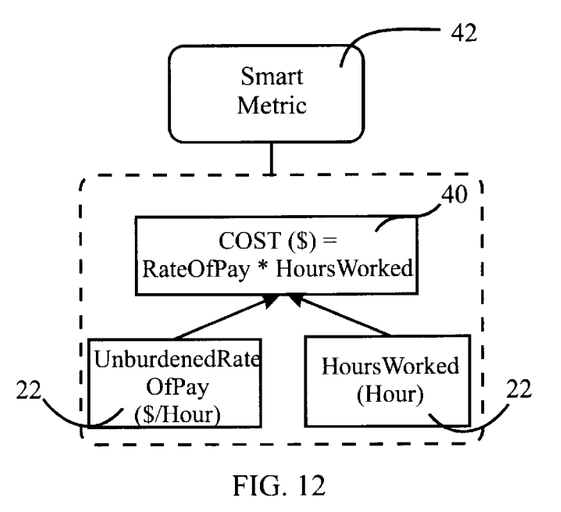
FIG. 12 is an example of a Smart Metric.

FIG. 12 provides an example of a Complex Metric Expression 40 comprising two atomic measurements which are multiplied together. A Complex Metric Expression 40 may also be a constant.

Figure 13:
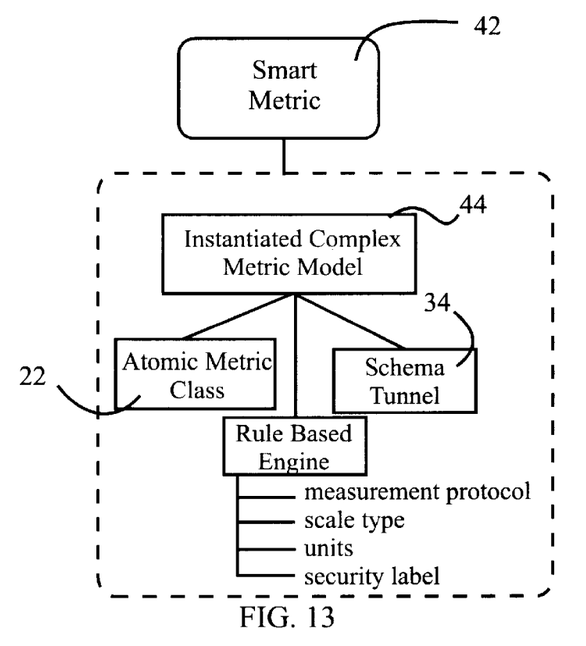
FIG. 13 depicts a more complex Smart Metric.

FIG. 13 depicts a further development of the present invention called the Smart Metric 42. The Smart Metric 42 has a Rule Based Engine associated with it. This Rule Based Engine is a hierarchical structure comprising the Complex Metric 40 and other Smart Metric 42 nodes. Based on the value generated by the Complex Metric 40 at the node, a specific path is selected. Each path from a Complex Metric 40 Node identifies an acceptable range of values for the Complex Metric 40. These ranges do not overlap and the set of all paths from the Complex Metric 40 Node identify all possible values of the Complex Metric 40. As these paths are traversed, statistics are collected to support feature extraction. This novel approach to metric calculation provides a mechanism for identifying various characteristics of measurable objects, including security access level, and generating different calculations based on these characteristics.

A strength of this novel approach is that the actual Instantiated Measurement Object Models are not needed to develop the various Complex and Smart Metrics 40 and 42. Only the Measurement Object Model (see above) is needed. Once the Complex Metric Model 32 is developed, an instantiation of the Complex Metric Model 32 can be generated using harvested Instantiated Measurement Object Models (see above).

Trusted Metrics Policy Assurance

With any software application that is distributed across a local or global network, there are various threats to the data's integrity (such as uncontrolled dissemination) that may inhibit the effective use of the tool of the present invention. Subsequently, this invention uses a Discretionary Access Metric Policy to publish rules for control of data measuring, harvesting, persistent storage and display of Atomic and Complex metrics. Security is enforced via Smart Metrics.

Accurately Representing History

A part of the problem with existing historical metric databases is that it is extremely difficult to accurately represent and extract past measurement history. The data in question at some time t may have portions of the data overwritten or missing. The present invention solves this problem by harvesting and maintaining static snapshots of the data environment at regular intervals which contain sufficient information to accurately represent history. By applying the Complex Metric (see above) to the static snapshot, prior history can be correctly represented.

Figure 14:
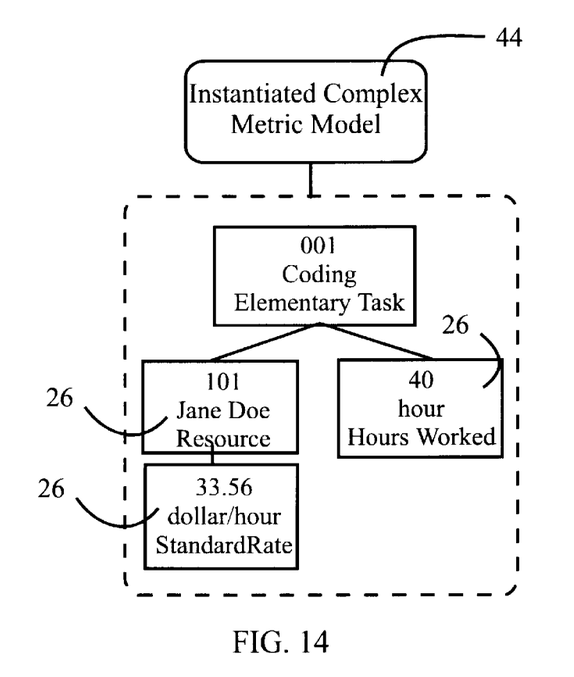
FIG. 14 is an example of an Instantiated Complex Metric Model.

FIG. 14 shows an example of this static snapshot idea. An instantiated Complex Metric Model (see above) is called a Instantiated Complex Metric Model 44. This Instantiated Complex Metric Model 44 is an organized structure of Atomic Metric Classes 26 based on the Complex Metric Model (see above). The Instantiated Complex Metric Model 44 is the representation of the software development environment at some time period, t. FIG. 14, therefore, is an example of an instantiated Complex Metric Schema at time, t.

Figure 15:
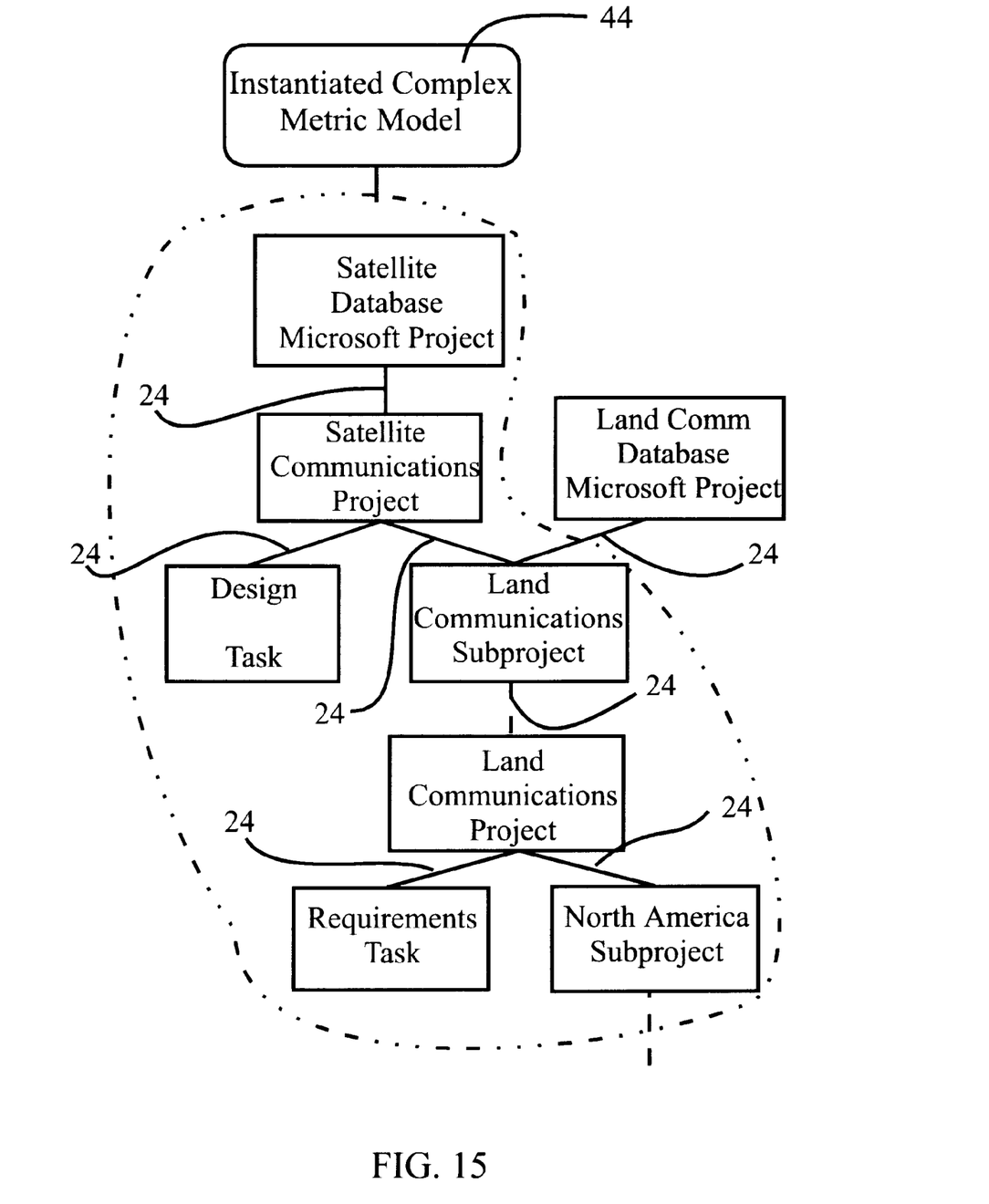
FIG. 15 is a more complex example of an Instantiated Complex Metric Model.
Figure 16:
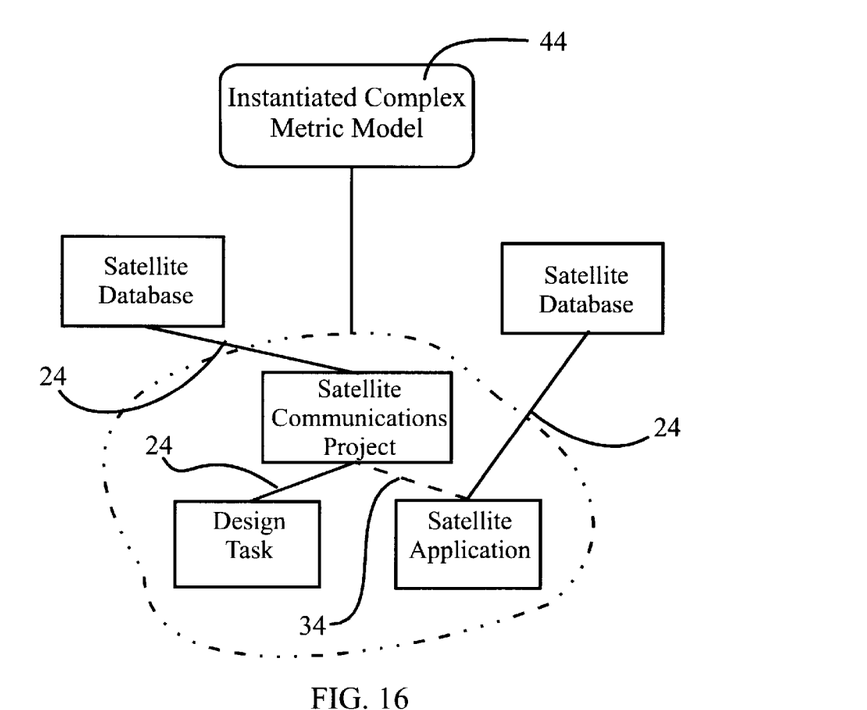
FIG. 16 is another complex example of an Instantiated Complex Metric Model.

FIGS. 15 and 16 bring out a further strength of the present invention. Because the Atomic Relationship Class 24 is embedded within the Measurement Object Model (see above) and because the Measurement Object Model (see above) is the basis of the Complex Metric Model (see above), any links based on Atomic Relationship Classes 24 are inherently automated. In contrast, the Schema Tunnel (see above) relationship is not embedded within the Measurement Object Model (see above), therefore the end-user must define the objects involved in a Schema Tunnel (see above) relationship for definition/embedding in the Complex Metric Model (see above). Once the definitions are in place, the Instantiated Complex Metric Model 44 can be generated over any time period.

FIG. 15 is an instantiation of the Complex Metric Model 32 depicted in FIG. 9. The structure of FIG. 9 includes only those relationships defined by Atomic Relationship Classes 24. Once the end-user selects the top level object, the Instantiated Complex Metric Model 44 can be generated.

FIG. 16 is an instantiation of the Complex Metric Model 32 depicted in FIG. 10. The structure of FIG. 10 includes both Atomic Relationship Classes 24, as well as a Schema Tunnel 34. Once the end-user selects the top level object and identifies the objects used for the Schema Tunnel 34, the Instantiated Complex Metric Model 44 can be generated. With this novel approach, history can be correctly, consistently, and accurately represented.

Organization of Complex Metrics

Figure 17:
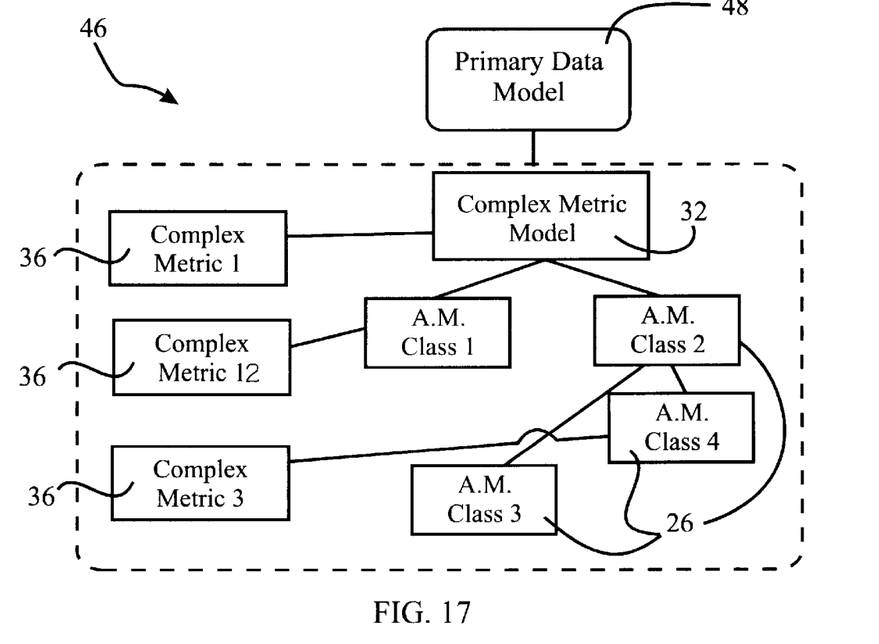
FIG. 17 depicts an Analysis Pak.

As might be appreciated, the number of Complex Metrics (see above) which are possible is astounding. It would frustrate and intimidate a user if these metrics were all presented in an unorganized fashion. FIG. 17 depicts the present invention's solution to this problem, the Analysis Pak 46. An Analysis Pak 46 organizes complementary metrics in a logical and functional fashion. For example, one Analysis Pak 46, called Basic Project Control, might contain effort and schedule metrics. Another Analysis Pak 46 might contain project or software complexity metrics. An Analysis Pak 46 has a main component referred to as the Primary Data Model 48. The Primary Data Model 48 is a Complex Metric Model 32. Once the primary data model is completed, Complex Metrics 36 are associated to the different nodes of the Complex Metric Model 32.

Using this organizational structure, the end-user will be able to access the appropriate metric at the appropriate level of the Complex Metric Model 32. The invention provides for drilling down this hierarchical structure to examine each node and to analyze that node's Complex Metrics 36. This novel approach provides a mechanism for dynamically creating and presenting Complex Metrics 36 to an end-user. It is a consistent method or process of analysis for an end-user.

In the manner described herein, the user can use the present invention to forecast any smart of complex metric and thereby predict project progress. This forecasting could be responsive to the age of the work product data, such that more recent data is "weighted" heavier then constructing said forecast. This unique forecasting means may ensure more accurate forecasting as a project nears completion. Standard forecasting means are also available.

Furthermore, "fuzzy metrics" may be provided by the present invention. An example of a "fuzzy metric" is one in which a particular metric is created automatically, in response to a project status, such as danger of exceeding project budget or time limits.

EXAMPLE

Analysis of the Software Development Environment

A comprehensive analysis capability is missing from today's software development environment. Different users include, but are not limited to, Project Management, Software Designers, Code Developers, and Company Executives. The present invention provides a mechanism for these and other users to gain insight into the software development environment. A Project Manager may be interested in effort, schedule, and project complexity. The Project Manager would use a data model which would provide this information. The power of the present invention is in the fact that it allows an end-user to use the data model to understand the underlying cause of problem areas. For example, suppose a Project Manager was behind schedule on Project X. Project X is composed of Tasks A, B, and C. Through analysis provided by the present invention, the Project Manager would be able to look at schedule metrics for A, B, and C. He finds that only Task C is behind schedule. This leads to further examination of Task C. Assume Task C is a design task. One problem could be the complexity of the design. The Project Manager would then begin examining design metrics to find the root causes of Task C's problem. All of the information can also be provided in the form of reports.

Another kind of user of this invention is a software designer. A software designer might be interested in software complexity and coupling of data. The software designer may establish a metric complexity threshold. When his design metric passes the complexity threshold, the software designer would be encouraged to reevaluate his design.

All of the data models particular to a software development environment together are referred to as its Complex Metric Schema. The Complex Metric Schema is easily extended and configurable to any software development environment through its Complex Metric Model. The Complex Metric Model provide the mechanism for developing different data models based on the software components in any software development environment. The Complex Metric Model also represents the analysis model for understanding the measurements.

The present invention is novel in that it seamlessly ties in all aspects of the software development environment to enable analysis of software measurements. It defines a repeatable measurement model that is used consistently across the entire software development environment. This invention provides a consistent means for organizing the data and for presenting the data in different views to different end-users. It provides for the successfully integration of measurement throughout the software life cycle.

OTHER EXAMPLES

The method of the present invention has wide-ranging applicability. Those applications discussed above are merely examples to illuminate the strengths of the invention. Other examples applications might be the incorporation of the method as firmware in a plant control system for manufacturing process analysis and control. Another example application might be incorporation into medical diagnostic systems in order to predict and potentially control patient viability. A further example application might be in computer network management, such that network loading and usage might be analyzed and forecasted.

These are merely more examples of the wide-range of applications for which the present method would be suitable. As can be appreciated, the list of applications is virtually endless.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

DEFINITIONS

1. Analysis Pak: A file that captures important information necessary for exchanging software metrics. It presents an analysis model used for understanding metrics. The Analysis Pak is an organized structure of a Complex Metric Model and associated Complex Metrics and Smart Metrics.
2. Atomic Measurement Class: Describes the measurement to be taken on a software component
3. Atomic Measurement Object: An object that contains the actual measurement generated based on a Measurement Protocol. This is a description of each of an actual data set.
4. Atomic Metric Class: the kind of object to be measured
5. AtomicMetricObject: an occurrence of the object to be measured
6. Atomic Relationship Class: Defines a relationship from one type of software component to another software component. These may be described as primary relationships, such as relationships that may be pre-defined by one particular software application.
7. CASE (Computer Aided Software Engineering) Tool: Software application using computers to aid in the software engineering process. It may include the applications of software tools to software design, requirements, tracing, code production, testing, document generation, and other software engineering activities.
8. Comparing: A comparing step embodies comparing two or more data to provide a result such as filtering, annotating, forecasting and amplifying through complex and smart metrics.
9. Complex Metric: A software metric that is formed from a combination of one or more atomic metrics or existing Complex Metrics. These are comparisons between the nodes of the atomic metric objects.
10. Complex Metric Model: Is an set of rules which organize Atomic Metric Class objects in a hierarchical structure for the purpose of calculating Complex Metrics
11. Discretionary Access Metric Policy: A set of rules under which indexed data is identified by a security parameter. The Complex and Smart metrics are then responsive to a user's access level and the security parameter, such that there is control over the information that may be analyzed and/or displayed by a particular user.

12. Harvestor: Represents a software component which interacts with the Mediator to extract the metric data
13. Instantiated Complex Metric Model: Is an object created under the set of rules which comprise the Complex Metric Model.
14. Instantiated Measurement Object Model: Is a hierarchical structure which organizes the actual software components of a CASE Tool file or database and associates a set of actual measurements to these software components. An instantiation of the hierarchical index.
15. Measure: Maps an empirical attribute to the formal, mathematical world
16. Measurement Instrument: the set of all probes associated with a software tool
17. Measurement Object Model: Is a hierarchical structure which organizes the measurable objects of a CASE tool file or database and associates a set of measurements to each of these objects. An example is a hierarchical index that is linked to each of the input data components.
18. Measurement Probe: Functionality which performs the measurement on software component based on a Measurement Protocol
19. Measurement Protocol: A descriptor defining rules on how a measurement is obtained. Eventually the rules will use assertion logic to describe the rules of measurement which can be validated. An example of assertion logic might be the specification of the expected security rating of a particular class of data.
20. Mediator: An agent that transfers harvested metric data from software tools files or databases to the metric repository.
21. Metric Data: Also called quantitative and qualitative interval and ratio data; measurements which identify or describe subjects (or objects) not only on the possession of an attribute but also by the amount or degree to which the subject may be characterized by the attribute
22. Parser: Decomposes a Complex Metric expression so that a value may be generated
23. Path Feature Extraction: Statistical information provided by a Decision Tree identifying the percentage of elements along a certain path
24. Probe: Performs a measurement according to a Measurement Protocol
25. Scale Type: Is a general term used to refer to ordinal, nominal, interval, or ratio
26. Schema Tunnel: A relationship between complex metrics that is not defined by an Atomic Metric Class, typically defined by the user or an Analysis Pak. May also be described as a secondary relationship.
27. TimeStamp: Represents universal time
28. UnitClass (unit definition model): Defines the measurement units
29. WorkProduct: Is the product of a software tool. Also is a tangible object produced as a result of task effort which can be measured
30. WorldIdentificationNumber: Unique identification number

What is claimed is:

1. A method of providing a universal data analysis, measurement and control system for a variety of types of input data components comprising data sets, the method being implemented in a programmed computer comprising a processor, at least one data storage system, at least one input device and at least one output device, the method comprising the steps of:

generating, by means of the programmed computer, at least one hierarchical index linked to each of the input data components, said at least one index being generated under pre-defined formatting rules and further including a description of each of the data sets, each said data set description including at least one quantified description of each data set;

storing said at least one index in at least one of the data storage systems;

instantiating said at least one index by means of the programmed computer;

storing said instantiation of said at least one index in at least one of the data storage systems;

comparing at least one of the data sets linked to at least one of said instantiated indexes to at least another of the data sets linked to at least another of said instantiated indexes by means of the programmed computer; and applying the output of said comparing to at least one of the output devices.

2. The method of claim 1, wherein said data set descriptions are in standardized and consistent forms that further comprise primary relationships between the data sets of a common input data component.

3. The method of claim 2, wherein each said data set description further comprises at least one name of each data set.

4. The method of claim 3, wherein said index is expandable to link to later-added input data components.

5. The method of claim 4, wherein said instantiating periodicity is responsive to elapsed time since the last instantiation.

6. The method of claim 5, wherein said instantiating periodicity is further responsive to changes in the input data components.

7. The method of claim 6, wherein said instantiating periodicity is further responsive to request through at least one of the input devices.

8. The method of claim 5, wherein said comparing further comprises a second comparing, comprising comparing at least one of said data set descriptions of at least one of said instantiated indexes to at least one of said data set descriptions of at least another of said instantiated indexes.

9. The method of claim 8, wherein said comparing is further organized by said primary relationships.

10. The method of claim 9, further comprising:

a defining step, before said comparing step, said defining step comprising defining at least one secondary relationship by input to the programmed computer through at least one of the input devices, said at least one secondary relationship comprising a relationship between the data sets of different input data components.

11. The method of claim 10, wherein new secondary relationships are definable at any time.

12. The method of claim 11, wherein said comparing and said second comparing are further organized by said secondary relationships.

13. The method of claim 12, wherein said comparing and said second comparing further comprise a calibrating step comprising calibrating each of said compared data sets to its corresponding data set and further calibrating each of said second compared data set descriptions to its corresponding second compared data set description.

14. The method of claim 12, further comprising a second applying step after said generating step, comprising applying said at least one hierarchical index to at least one of the output devices.

15. A method of providing a standardized hierarchical index to a variety of types of input data components comprising data sets, the method being implemented in a programmed computer comprising a processor, at least one data storage system, at least one input device and at least one output device, the method comprising the steps of:

generating, by means of the programmed computer, at least one hierarchical index linked to each of the input data components, said at least one index generated under pre-defined format rules and further including a description of each of the data sets, said data set description including at least one quantified description of each data set;

storing said at least one index in at least one of the data storage systems;

instantiating said at least one index by means of the programmed computer; and storing said instantiation of said at least one index in at least one of the data storage systems.

16. The method of claim 15, wherein said data set descriptions are in standardized and consistent forms that further comprise secondary relationships between the data sets of a common input data component.

17. The method of claim 16, wherein each said data set description further comprises at least one name of each data set.

18. The method of claim 17, wherein said index is expandable to link to later-added input data components.

19. The method of claim 18, wherein said instantiating periodicity is responsive to changes in the input data components.

20. The method of claim 19, wherein said instantiating periodicity is further responsive to elapsed time since the last instantiation.

* * * * *

US005930798C1

(12) EX PARTE REEXAMINATION CERTIFICATE (5289th)
United States Patent
Lawler et al.

(10) Number: US 5,930,798 C1
(45) Certificate Issued: Mar. 7, 2006

(54) UNIVERSAL DATA MEASUREMENT, ANALYSIS AND CONTROL SYSTEM

(75) Inventors: James M. Lawler, San Diego, CA (US); Tina M. Navarro, San Diego, CA (US)

(73) Assignee: Predicate Logic, San Diego, CA (US)

Reexamination Request:
No. 90/006,403, Oct. 7, 2002

Reexamination Certificate for:
Patent No.: 5,930,798
Issued: Jul. 27, 1999
Appl. No.: 08/698,091
Filed: Aug. 15, 1996

(51) Int. Cl.
*G06F 17/30* (2006.01)

(52) U.S. Cl. ............... 707/102; 707/103 Y; 707/103 R; 717/101; 717/104; 717/128; 704/38

(58) Field of Classification Search ................. 707/102, 707/103 Y, 103 R; 717/101, 104, 120, 128, 717/141, 162, 170; 714/38
See application file for complete search history.

(56) References Cited

PUBLICATIONS

Qian et al., "An Object Oriented Database for the display measurement and analysis system", ACM, 1993, pp. 384–392.*

* cited by examiner

*Primary Examiner*—Jean M. Corrielus (57) ABSTRACT

A universal data measurement, analysis and control system is disclosed. The system will permit end-users to analyze the measurement protocol by publishing the data gathering environments and data definitions. The disclosed system will manage the exchange of data between different software applications and provide consistent metric data outputs. Furthermore, the disclosed method provides an analysis system that defines a consistent and repeatable measurement model that also supports changes to a control object over time in addition to changes to the measurement data associated with the control object. Specifically disclosed is a method for gathering engineering change proposal data, for determining the causes for the engineering change proposal, and also providing a historical repository. As it applies to software development, the disclosed method defines a model for maintaining measured data, a consistent method for harvesting data from within the software development environment, a reporting mechanism for displaying the measurement data in a timely format, and also provides a mechanism for analysis of software process improvement, in addition to software project analysis.

US 5,930,798 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 15 are determined to be patentable as amended.

Claims 2–14 and 16–20, dependent on an amended claim, are determined to be patentable.

1. A method of providing a universal data analysis, measurement and control system for a variety of types of input data components comprising data sets, the method being implemented in a programmed computer comprising a processor, at least one data storage system, at least one input device and at least one output device, the method comprising the steps of:
   generating, by means of the programmed computer, at least one hierarchical index linked to each of the input data components, said at least one index being generated under pre-defined formatting rules and further including a description of each of the data sets, each said data set description including at least one quantified description of each data set;
   storing said at least one index in at least one of the data storage systems;
   [instantiating said at least one index by means of the programmed computer;]
   *first instantiating at least one said index by means of the programmed computer;*
   *second instantiating at least one said index by means of the programmed computer;*
   storing said *first and second* instantiations of [said] at least one *said* index in at least one of the data storage systems;
   comparing at least one of the data sets linked to at least one of said instantiated indexes to at least another of the data sets linked to at least another of said instantiated indexes by means of the programmed computer; and
   applying the output of said comparing to at least one of the output devices.

15. A method of providing a standardized hierarchical index to a variety of types of input data components comprising data sets, the method being implemented in a programmed computer comprising a processor, at least one data storage system, at least one input device and at least one output device, the method comprising the steps of:
   generating, by means of the programmed computer, at least one hierarchical index linked to each of the input data components, said at least one index generated under pre-defined format rules and further including a description of each of the data sets, said data set description including at least one quantified description of each data set;
   storing said at least one index in at least one of the data storage systems;
   [instantiating said at least one said index by means of the programmed computer; and]
   *first instantiating at least one said index by means of the programmed computer;*
   *second instantiating at least one said index by means of the programmed computer;*
   storing said *first and second* instantiations of [said] at least one *said* index in at least one of data storage systems;
   comparing at least one of the data sets linked to at least one of said instantiated indexes to at least another of the data sets linked to at least another of said instantiated indexes by means of the programmed computer; and
   applying the output of said comparing to at least one of the output devices.

\* \* \* \* \*